Oct. 31, 1967 R. C. LOVING ET AL 3,350,123
FRAMING CLIP
Filed Sept. 3, 1965
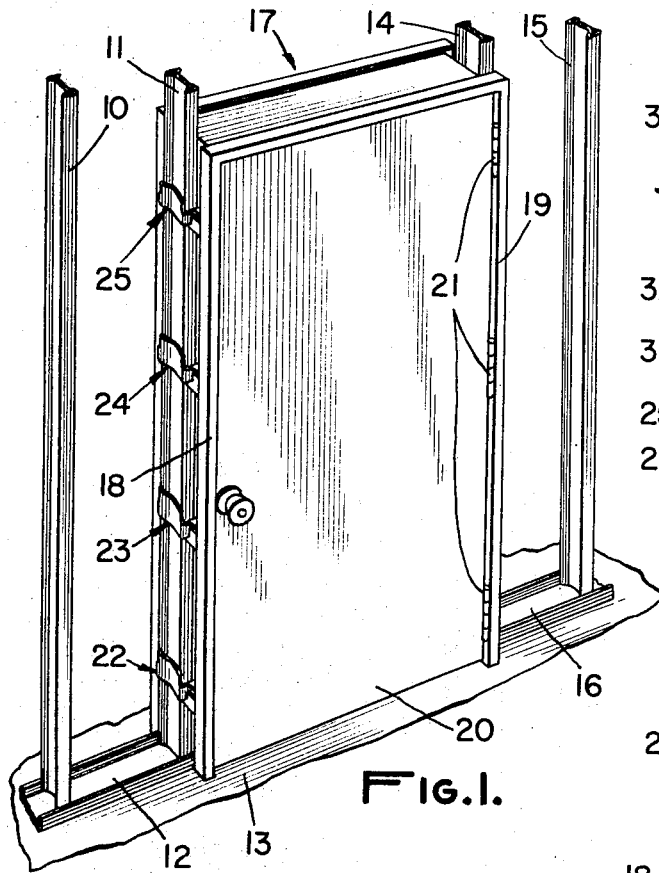
FIG.1.
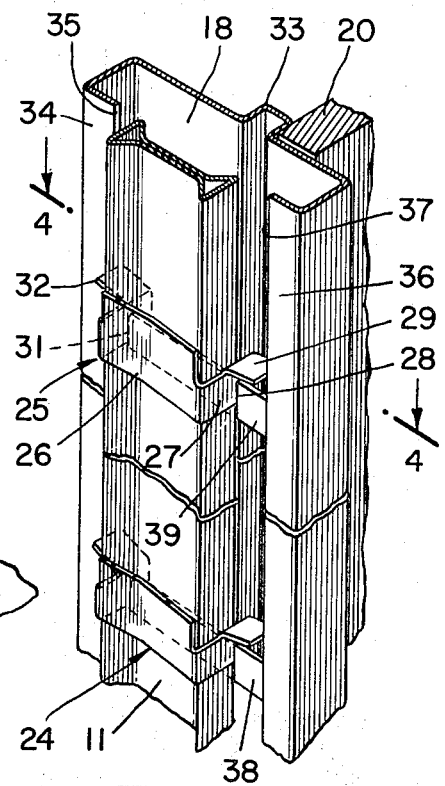
FIG.3.
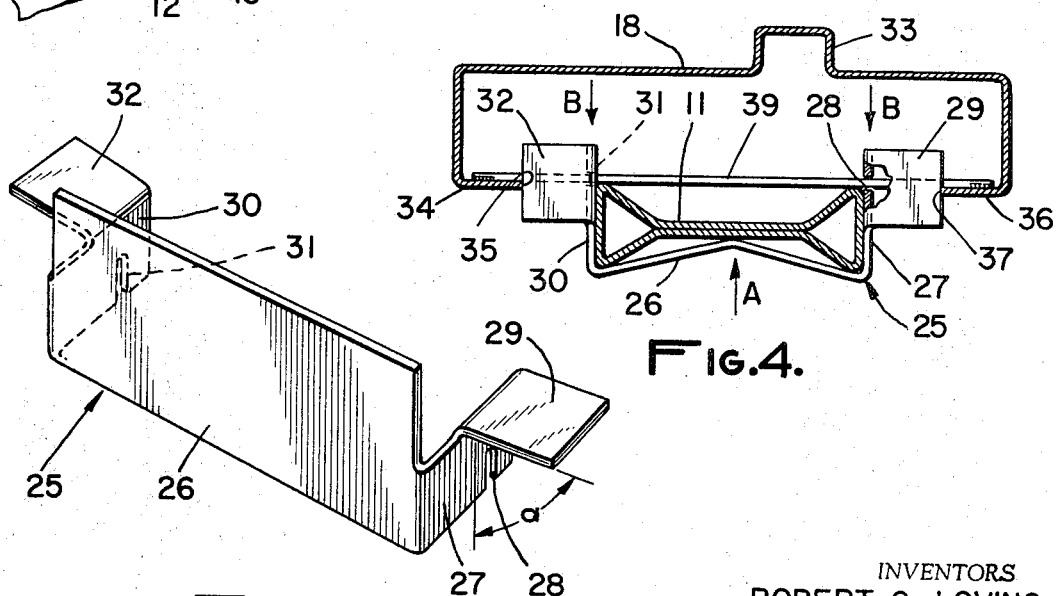
FIG.2.
FIG.4.
INVENTORS
ROBERT C. LOVING
BY ROBERT M. POLAND
Elliott & Pastoriza
ATTORNEYS

United States Patent Office 3,350,123
Patented Oct. 31, 1967

3,350,123
FRAMING CLIP
Robert C. Loving, 3925 Alla Road, and Robert M. Poland, 3741 Mount View Ave., both of Los Angeles, Calif. 90066
Filed Sept. 3, 1965, Ser. No. 484,955
2 Claims. (Cl. 287—189.35)

ABSTRACT OF THE DISCLOSURE

This disclosure relates to a framing clip to facilitate securing a stud to a door frame. This securing is achieved by a series of clips as opposed to the conventional welding method. The clip includes a plate having a pair of spaced legs extending at right angles and including parallel slots. The plate and legs will straddle the stud and the slots are arranged to be received over a cross brace forming a part of the door frame. Each of the legs also includes on its upper edge an outwardly extending tab arranged to be bent down into opposing flange portions of the door frame. The rear of the plate can then be deformed to effect a tight and secure connection of the stud to the door frame.

---

This invention relates generally to a method and means for securing structural building members in assembled relationship and more particularly, relates to a method and means for securing door frames to wall studs.

Construction of the interior walls of apartments, office buildings, and the like, is often accomplished in part by the use of horizontally extending metal framing members or beams forming the bottom and top of such walls. Vertically extending metal studs extend between the framing members as support for the particular wall covering which may be employed.

With present construction practice, certain of the metal studs are positioned proximate to opposite sides of door openings such that door frame members may be attached thereto. The door frame members may be secured to the metal studs by bolts, screws, or other conventional metal connecting members. More frequently, however, welding is employed which requires expensive equipment and trained personnel. Moreover, it has been found that when the door frames and wall studs are constructed of galvanized metal, the welding thereof is extremely difficult because the metal tends to melt or burn away under the heat of the welding torch.

Further disadvantages associated with welding include the fact that the welding process itself includes no method or means for insuring that the door frame will be vertically aligned with respect to the wall stud after the members have been welded together. In addition, it is apparent that once the door frame and stud have been welded together, it is difficult to break the connection therebetween should it be desired to later plumb the door frame or move it bodily to another position.

With the foregoing in mind, it is accordingly a primary object of this invention to provide a novel method and means for securing a door frame to adjacent wall studs without welding being required.

Another object is to provide a method and means for securing a door frame to adjacent wall studs in a manner which assures that the door frame is vertically aligned with the wall stud.

Another object is to provide a method and means for securing a door frame to a wall stud which eliminates the use of bolts, screws, and the like.

Still another object is to provide a method and means for securing a door frame to adjacent wall studs in a proper vertically aligned position without the need of special tools or skilled workmen.

Yet another object is to provide a novel securing means for coupling a door frame to a wall stud which can be easily disassembled without damaging the door frame or wall studs to the end that the door frame may be easily moved to a new location.

Other objects are to provide a securing means which is simple in construction and economical to manufacture.

Briefly, these and many other objects and advantages of the present invention are attained by providing a novel framing clip which is adapted to be fitted about a wall stud to engage and secure a door frame in assembled relationship with the wall stud. In accordance with a preferred embodiment, the clip comprises a plate having a pair of spaced legs to provide a generally U-shaped member. Defined within each of the legs is a vertical slot extending upwardly from the bottom portions of the legs. Each leg further includes a tab extending upwardly and outwardly therefrom.

The framing clip is uniquely designed to co-function with conventional metal studs and door frames. Metal door frames usually include a plurality of vertically spaced, horizontally extending cross braces. The clip member is positioned with its plate portion against the back of the stud with its legs extending past each side and the slots thereof engaging one of the cross braces of the door frame member. The tabs are thus positioned adjacent to the inner edges of the door frame above the cross brace and may then be bent downwardly into firm engagement therewith, thus centering and vertically aligning the door frame with the wall stud.

The final step of assembly simply involves bending the back or plate portion of the clip into closer engagement with the back of the wall stud, thus drawing the door frame into firm engagement with the stud.

A better understanding of the invention will now be had by referring to a preferred embodiment as illustrated in the accompanying drawings, in which:

FIGURE 1 is a fragmentary perspective view of a portion of the framing structure of an interior wall showing a door frame coupled to adjacent wall studs in accordance with the invention;

FIGURE 2 is a perspective view of the novel framing clip;

FIGURE 3 is a fragmentary perspective view of a door frame member coupled to a wall stud by means of the framing clips of this invention; and FIGURE 4 is a cross-sectional view taken in the direction of the arrows 4—4 of FIGURE 3.

Referring first to FIGURE 1, there is shown a pair of spaced metallic wall studs 10 and 11, respectively, being secured at their bottom ends to a first channel member 12 secured to and extending along a floor 13. Aligned with the wall studs 10 and 11 is a second pair of spaced metallic wall studs 14 and 15, respectively, secured at their bottom ends to a second channel member 16, which is aligned with the first channel member 12. The top portions (not shown) of the wall studs are connected to the ceiling in a similar manner. The above-mentioned wall studs and channel members comprise a portion of the framing structure of an interior wall and are arranged with respect to each other in the conventional manner.

Shown positioned between the wall studs 11 and 14 is a conventional metal door frame 17 which includes vertically extending frame members 18 and 19, respectively. A door 20 is hung on the frame member 19 by means of a series of hinges 21 in a conventional manner.

In accordance with the invention, the frame member 18 is coupled to the adjacent wall stud 11 by means of a series of vertically spaced identical framing clips 22, 23, 24, and 25, as shown. It is to be understood that the frame member 19 may be coupled to the wall stud 14 in the same manner.

Referring now to FIGURE 2, the clip 25, which is typical of the other clips, will be seen more clearly and is shown in its configuration prior to assembly. The clip 25 includes a generally rectangular plate 26 having a leg 27 integrally connected to an end thereof and extending outwardly therefrom at a right angle. Defined within the leg 27 is a slot 28 extending upwardly from the bottom of the leg in a direction generally parallel to the plate 26. The leg 27 further includes a rectangular tab 29 integrally connected to a portion of the top of the leg and extending upwardly and outwardly therefrom at an angle "a" which preferably exceeds 90 degrees as shown.

The clip 25 further includes a leg 30 integrally connected to the other end of the plate 26 and extending outwardly therefrom at a right angle so as to be parallel with the leg 27 previously described. The leg 30 is similarly provided with a slot 31 and tab 32 which are constructed and arranged in the same manner as is the slot 28 and tab 29 heretofore described with reference to leg 27.

By the foregoing arrangement, a symmetrical unitary clip is provided which is adapted to be utilized in a manner which will become apparent as the description proceeds.

Referring now to FIGURE 3, the manner in which each of the clips of this invention secures a wall stud and door frame in assembled relationship will be seen more clearly. As shown, the vertical frame member 18 of the door frame includes an out-turned abutment portion 33 which serves to position the door 20 with respect to the frame 18 when the door is closed. The frame member 18 further includes a lateral and inwardly extending longitudinal flange 34 running along its length and terminating in an edge 35. Similarly, a turned-in flange 36 terminating in an edge 37 is disposed on the other side of the frame 18. The flanges 34 and 36 are thus aligned with each other and the edges 35 and 37 are disposed in parallel relationship.

Secured to the in-turned surfaces of the flanges 34 and 36, respectively, are a series of horizontally extending, vertically spaced cross braces such as shown at 38 and 39. Shown positioned on the cross braces 38 and 39 in accordance with the invention, are clips 24 and 25, respectively.

The method and means by which each of the clips secures the door frame to the wall stud will now be described. With reference still to FIGURE 3, the plate 26 of the clip 25 is positioned adjacent to the back of the wall stud 11, with the legs 27 and 30 straddling the sides of the wall stud. The clip is then lowered with the slots 28 and 31 engaging over the top of the cross brace 39 thereby positioning the cross brace adjacent to the wall stud. As best shown in FIGURE 4, the frame member 18 of the door frame is then aligned with the wall stud so that the outer edges of the tabs 29 and 32 are engaged with the edges 37 and 35, respectively. Each of the tabs 29 and 32 is then bent downwardly by means of a sharp tap with a hammer to thereby move the outer edges of the tabs into firm wedge-tight engagement with the edges 35 and 37 of the frame member 18.

To complete the installation and with reference still to FIGURE 4, the central portion of the plate 26 is struck with a hammer in the direction of the arrow A to thereby bend the plate to the position shown. This bending movement causes the legs 27 and 30 to move slightly in the direction of arrows B, thus drawing the cross brace 39 into snug engagement with the wall stud 11.

In a similar manner and with reference now to FIGURE 1, each of the clips 22, 23, and 24 is positioned and installed to thereby secure the door frame in vertical alignment with the wall stud 11. If for any reason it is decided to reposition the door frame in another location in the wall, the clips may be removed by simply striking the lower edge of the plate with a hammer in an upward direction thereby causing the clip to move upwardly out of engagement with the cross brace and edges of the door frame.

From the foregoing description, it is apparent that this invention provides a simple and economical method and means for securing a door frame to adjacent wall studs, while eliminating the need for bolts, screws, or welding, and at the same time, assuring that the door frame will be properly vertically aligned with the wall stud.

Various changes falling within the scope and spirit of this invention will occur to those skilled in the art. The framing clip structure is therefore not to be thought of as limited to the specific embodiment set forth.

What is claimed is:

1. A framing clip securing a door frame to a wall stud, comprising, in combination: a plate positioned adjacent to said stud, said plate having a pair of legs extending therefrom so as to receive said stud therebetween, each of said legs having an open-ended slot extending upwardly from the bottom thereof; a cross brace mounted on said door frame, said slots in said legs being fitted over said cross brace to thereby position said wall stud adjacent to said cross brace; and an upturned tab integrally attached to each of said legs and extending outwardly therefrom into wedge-fit engagement with edge portions of said door frame, said clip being deformed into engagement with the stud.

2. A framing clip for securing a door frame to a wall stud, comprising: a plate having a pair of spaced legs extending outwardly therefrom at right angles thereto, each of said legs having an open-ended slot extending upwardly from the bottom thereof, the slots being generally parallel to said plate; and each of said legs having an upturned tab integrally attached to a top portion of the leg and forming an obtuse angle with the outside surface of the leg such that the tabs extend upwardly and outwardly away from each other.

References Cited

UNITED STATES PATENTS

| 1,271,210 | 7/1918 | Otte | 52—211 |
| 2,746,109 | 5/1956 | Budai | 287—189.35 |
| 2,910,155 | 10/1959 | Bradner | 287—189.360 |
| 3,103,263 | 9/1963 | Leeser | 52—211 |

FOREIGN PATENTS 516,104   12/1939   Great Britain.

EDWARD C. ALLEN, *Primary Examiner.*